No. 781,286. PATENTED JAN. 31, 1905.
A. DE LASKI.
METHOD OF MAKING WHEEL TIRES.
APPLICATION FILED MAY 13, 1903.

Witnesses:
F. G. Hachenberg.
Henry Thieme.

Inventor:
Albert De Laski
By Brown & Seward
his Attorneys

No. 781,286.

Patented January 31, 1905.

UNITED STATES PATENT OFFICE.

ALBERT DE LASKI, OF WEEHAWKEN, NEW JERSEY.

METHOD OF MAKING WHEEL-TIRES.

SPECIFICATION forming part of Letters Patent No. 781,286, dated January 31, 1905.

Application filed May 13, 1903. Serial No. 156,901.

*To all whom it may concern:*

Be it known that I, ALBERT DE LASKI, a citizen of the United States, and a resident of Weehawken, in the county of Hudson and State of New Jersey, have invented a new and useful Method of Making Wheel-Tires, of which the following is a specification.

My invention relates to the method of makgin wheel-tires; and it consists, broadly, in forming an annular tube of woven fabric, inserting therein a liner-tube of rubber, uniting the ends of the inner tube and the ends of the outer tube, inflating the inner tube, and thereby distending the woven tube to form a mandrel, winding a jacket on said mandrel, and finally coating the wound mandrel with rubber.

My invention further consists in certain more specific steps of procedure in the formation of a wheel-tire, as will be fully explained, and pointed out in the claims.

Figure 1:
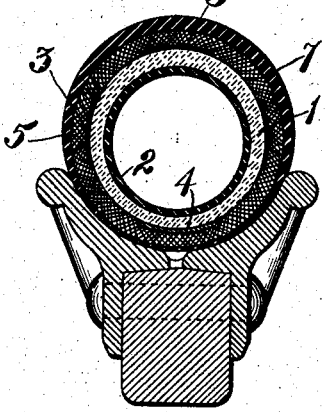
Figure 2:
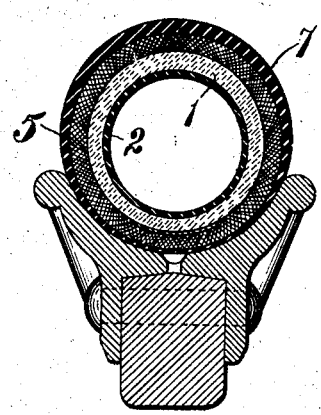
Figure 3:
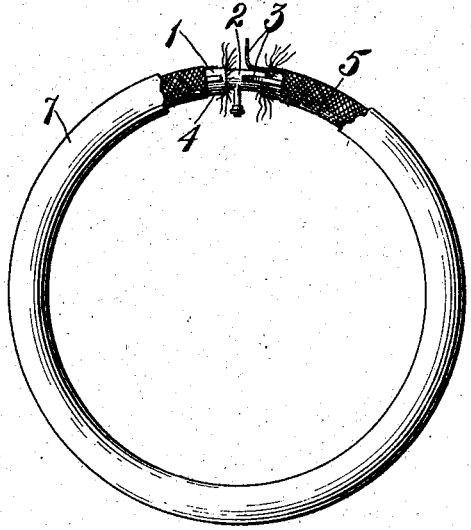
Figure 4:
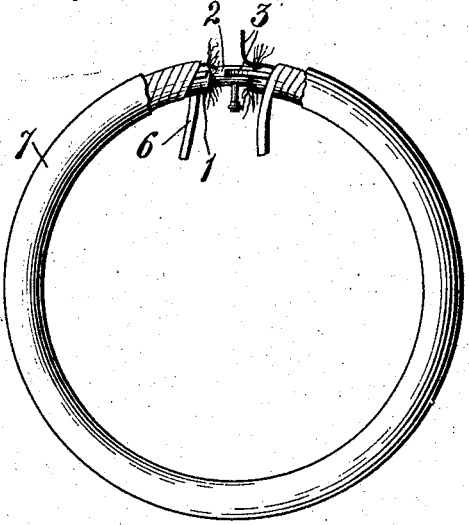

In the accompanying drawings, Figure 1 represents a cross-section of a complete tire. Fig. 2 is a similar view of a modified form. Fig. 3 is a view in side elevation, partly in section, showing the wound jacket formed of threads; and Fig. 4 is a similar view showing the wound jacket formed of flat strips of treated material—such, for example, as what is known in the art as "friction-duck."

The annular woven tube (denoted in the drawings by 1) is preferably formed on a circular loom, and consequently is in normal condition when in annular shape, so that there is no tendency for its threads to creep or pucker when it is distended by its liner.

The rubber liner-tube is denoted by 2 and is of such size and elasticity that it will when inflated distend the annular woven tube into a comparatively firm condition, fifty pounds pressure to the square inch being ample under ordinary circumstances to give it the necessary rigidity, and this pressure has been materially reduced in many cases with satisfactory results.

The distended woven tube is preferably provided with one or more strips 3, of soft rubber, extending along its tread and along its opposite sides and also with one or more thin metal strips 4 along its inner face. The strips of metal and soft rubber may, however, be omitted, one or both of them, although my preferred method includes the introduction of the soft-rubber strips, one or more of them.

The strips 3, of soft rubber, and the metal strips when used are bound securely to the mandrel or woven tube by threads 5 wound spirally in opposite directions around the mandrel or by strips 6, of treated fabric, such as rubber tape or, preferably, friction-duck. This winding may be continued to form a jacket of the required thickness, and jacketed mandrel is then provided with a rubber covering 7, molded thereon, as is usual.

My process is carried into practical effect as follows: The woven annular tube has its warp-threads left unwoven for a distance of a few inches from its ends, and the liner-tube is inserted in this woven tube and its ends united, preferably by scarfing the ends and allowing them to enter the one within the other to form a lap-joint, which is sealed by suitable cement. This done, the ends of the woven tube are united by splicing the extending warp-threads, and then the inner tube is inflated under sufficient pressure to hold the woven tube quite rigidly distended. This distended woven tube is then used as a mandrel for winding the jacket of thread or strips thereon, the strips of soft rubber, which extend longitudinally of the tire, being fed to the mandrel by hand or otherwise as the winding progresses and the steel strip or strips when they are used having been placed in position before the winding began. The wound jacket having been placed in position, the subsequent molding of the outer rubber tube thereon may be performed in the well-known manner in common use.

The introduction of the soft-rubber strips, which at first cling tightly to the woven surface and which subsequently become under the vulcanizing process more intimately attached thereto, serve to prevent the spiral winding from slipping, causing it to maintain an even tension and restraining influence to overcome the tendency of the tire to creep on the rim when in use. This makes it feasible to use winding-thread which is not treated, and when the broader winding-strips of treated material are employed they may be used with fair results without the longitudinal soft-rubber strips, but coact with the soft-rubber strips when both are employed to produce an excellent restraining-jacket.

What I claim is—

1. The method of forming a wheel-tire consisting in providing a woven annular tube, inserting therein a rubber liner-tube, uniting the ends of each tube, inflating the inner tube to distend the woven tube to form a mandrel, winding a jacket on the said mandrel and finally molding a cover of rubber thereon.

2. The method of forming a wheel-tire consisting in providing a woven annular tube, inserting therein a rubber liner-tube, uniting the ends of each of the tubes, inflating the inner tube to distend the woven tube to form a mandrel, applying one or more strips of soft rubber to the mandrel, winding a jacket on said mandrel and soft-rubber strip or strips, and finally molding a rubber cover thereon.

3. The method of forming a wheel-tire consisting in providing an annular woven tube, inserting therein a rubber liner-tube, uniting the ends of each tube, inflating the inner tube to distend the woven tube to form a mandrel, applying one or more strips of soft rubber and one or more strips of metal to the surface of the mandrel, winding a jacket about the said strips and mandrel and finally molding a rubber cover thereon.

4. The method of forming a wheel-tire consisting in providing an annular woven tube, inserting therein a liner-tube of rubber, closing the ends of each of the tubes, inflating the liner-tube to distend the woven tube to form a mandrel, winding the mandrel with "friction-duck" and finally molding a rubber cover thereon.

In testimony that I claim the foregoing as my invention I have signed my name, in presence of two witnesses, this 4th day of May, 1903.

ALBERT DE LASKI.

Witnesses:
 FREDK. HAYNES,
 HENRY THIEME.